Figures 1, 3:
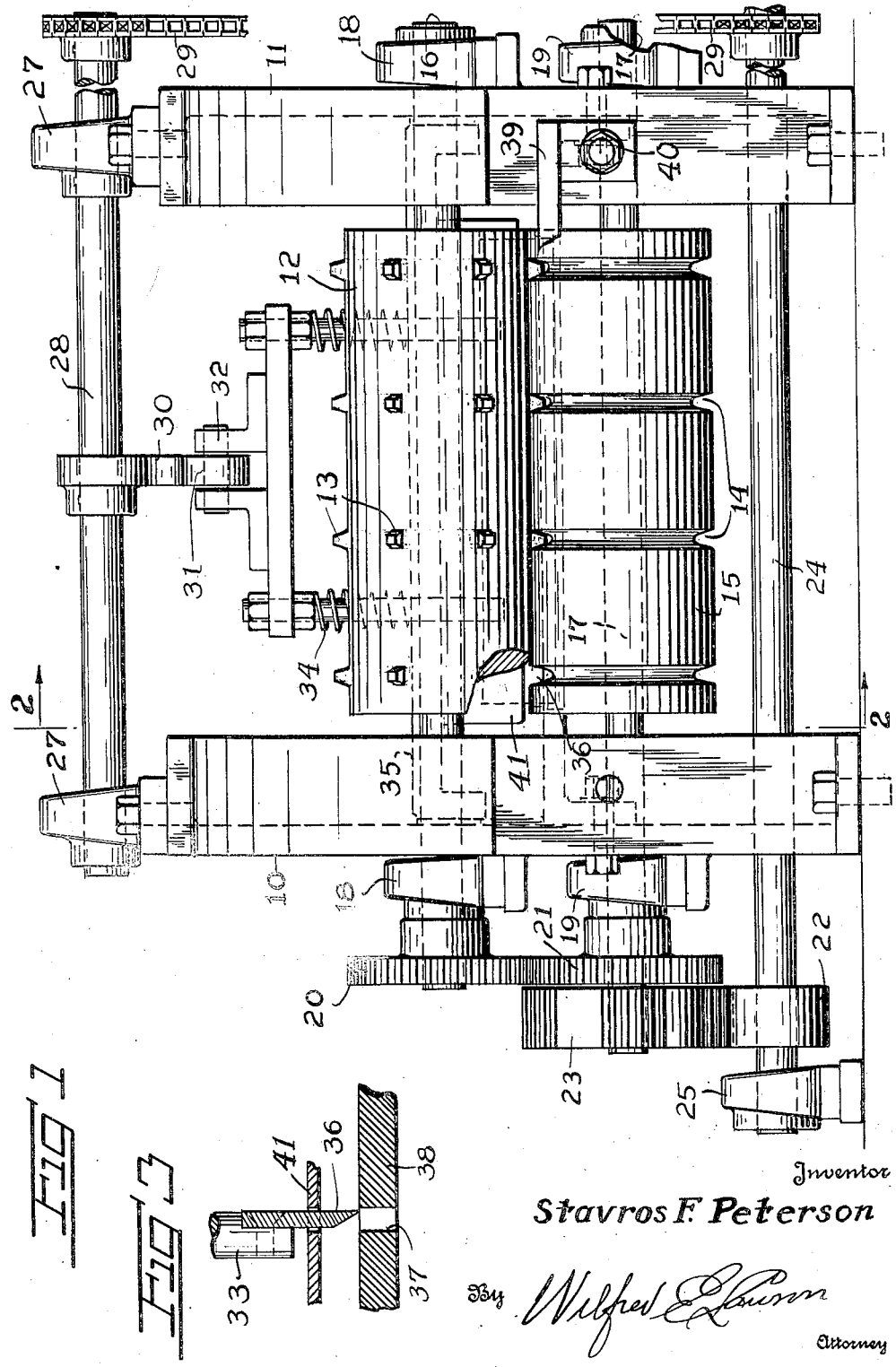

Dec. 13, 1949  S. F. PETERSON  2,490,980

FOOD CUTTING AND PRESSING MACHINE

Filed Dec. 5, 1946  2 Sheets-Sheet 1

Inventor
Stavros F. Peterson
By Wilfred E. Dunn
Attorney

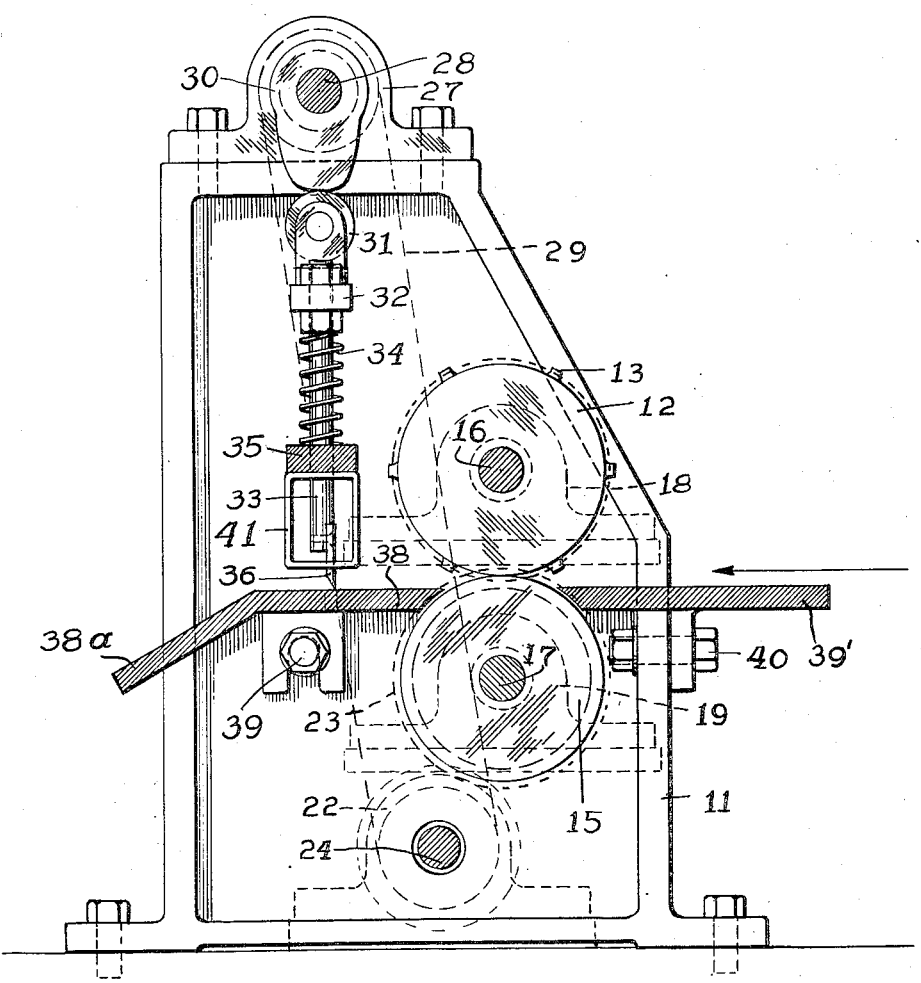
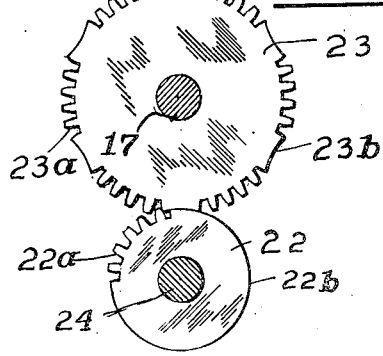

Patented Dec. 13, 1949

2,490,980

UNITED STATES PATENT OFFICE 2,490,980

FOOD CUTTING AND PRESSING MACHINE

Stavros Francis Peterson, New London, Conn.

Application December 5, 1946, Serial No. 714,291

5 Claims. (Cl. 107—21)

My invention has for its object to provide a machine for pressing and cutting food stuffs made in endless round strands or flat strings and although the subjoined specification minutely describes such a machine for joining together and cutting spaghetti, its application for use in manufacture of other food stuffs, having the same character, is also included.

One object and great advantage of this machine resides in the fact that the resulting bunches of spaghetti and the like, consisting of about seven strands all of one length and joined together, considerably facilitate cooking and make the eating of the food stuff easier.

Other objects and advantages of the invention will be given in the following description in connection with the attached drawing.

Figure 1 is a front elevation of a machine constructed in accordance with the present invention;

Figure 2 a vertical section taken on a plane along the line 2—2 of Figure 1;

Figure 3 a fragmentary vertical section of the table and knife or cutter blade; and Figure 4 a side elevation of the operating gears.

Like numerals represent the same details in the different views. One embodiment of the invention is illustrated on the drawings, wherein numerals 10 and 11, designate respectively left and right uprights or stands for the machine. The numeral 12 designates a top cylinder positioned between the uprights 10 and 11 and provided with four circumferential rows of studs 13, six being shown equally spaced around the cylinder and meshing with four grooves 14 in a lower cylinder 15. These cylinders constituting feeding and pressing rollers are mounted on shafts 16 and 17 respectively, which are supported in bearings 18 and 19 on the left and right uprights 10 and 11. These shafts are interconnected by gears 20 and 21 keyed on the left ends of the respective shafts.

The cylinders are given intermittent rotation thru their spur gears 20 and 21 by means of an intermittent pinion 22 carried on the drive shaft 24 supported between the uprights 10 and 11 with an additional bearing 25. The pinion 22 is in mesh with the gear wheel 23 thereabove keyed on the shaft 17 of the lower cylinder 15.

The pinion 22 revolves with uniform speed, but is provided with only five full gear teeth 22a while the rest of its surface 22b is perfectly smooth.

The companion gear 23 has six groups of gear teeth 23a which mesh with the pinion teeth 22a once for every revolution of pinion 22, while concave blanks 23b contact with the blank convex surface 22b. As a consequence, the gear wheel 22 makes only one sixth of a turn for each turn of the pinion and then stops and accordingly the two feed cylinders 12 and 15, thru their gears 20, 21, likewise make only one sixth of a turn at a time and are then locked.

Upon the tops of the stands 10, 11 are carried bearings 27 through which extends a cross shaft 28, which is driven from the drive shaft 24 by chain and sprocket gear 29 shown at the outside of the right upright 11. This cross shaft 28 carries, secured thereto in its middle, a cam 30 adapted to cooperate with a roller 31 turning freely in a bracket 32, which is mounted on a pair of plungers 33 actuated by springs 34 to urge the roller 31 against the cam 30 and being supported on a bridge 35 secured between the uprights 10 and 11. To the lower ends of plungers 33, below said bridge, a long shear-blade 36 is secured and having about the same length as the cylinders 12 and 15. This blade 36 has a beveled edge registering with a slot 37 provided across the horizontal front table 38, extending across the machine, and bolted as at 39 to the uprights 10 and 11. On the opposite side of the cylinders 12, 15 from the table 38 and in alinement therewith, is a rear extension table 39' for receiving the spaghetti or other similar string-like food stuff. The height of the horizontal top surface of the two tables 38, 39' is such as to feed the food stuff directly onto the top of the cylinder 15 and into the bight formed by the meeting surfaces of the two cylinders 12 and 15. The rear table is bolted as at 40 to the uprights 10 and 11.

In operation of this machine, it should be noted, that the spaghetti or other string food stuff is fed forwardly on the rear table 39' in between the cylinders or feeding and pressing rollers 12, 15, in bunches of seven or more into each groove 14 of the lower cylinder 15 and comes out over the downwardly tipped end 38a of the table 38, where they will be gathered up. These cylinders according to the invention are given an intermittent motion, so that when the pinion 22, on the drive shaft makes one revolution, the cylinders 12 and 15 are so geared that they make only one sixth of a revolution and then lock. This is for the purpose of allowing time for cutting operation which will be timed so as to cut midway between two pressure spots.

The numeral 41 generally designates a stripper which is supported by the bar 35 and through the lower portion of which the blade 36 extends. As will be readily apparent the blade 36 moves up and down relative to the lower part of the stripper so that after the blade has been moved down to the maximum extent, to the position in which it is shown in Figure 2 and then is moved upwardly by the spring 34, any food material which may cling to the blade will be removed or stripped off by the stripper frame 41.

When the bunch of seven or more strands in each groove 14 pass under the peg or stud 13 of the upper cylinder, they are pressed together and united into bunches or stacks, after cutting as described, will be 1¾ inch long joined together in the middle.

Four grooves 14 are shown in Figure 1, but it will be understood that any number, greater or smaller, may be used as required.

It is to be understood that the invention as herein disclosed may be varied from the details described and shown in without departure from the spirit of the subjoined claims.

I claim:

1. A machine for pressing together and cutting string-like food stuff, of which spaghetti is an example, comprising spaced supporting members, a pair of parallel cylinders rotatably supported between the members and in peripheral contact, one cylinder having a number of encircling grooves in the periphery thereof, a corresponding number of groups of studs carried by the other cylinder, said studs of each group being in relatively widely spaced relation circumferentially around the latter cylinder and each adapted to snugly engage in a groove in the rotation of the cylinders, means for rotating the cylinders together, a table on one side of the cylinders with its top at an elevation to facilitate the advancement of the string-like food stuff therefrom into the bight of the cylinders, a table on the other side of the cylinders for receiving the food stuff, a vertically reciprocating knife supported above the last mentioned table and coacting therewith to cut the food stuff strings moving thereacross from the cylinders, and means for intermittently reciprocating the knife.

2. A machine of the character described in claim 1 wherein the said means for intermittently reciprocating the knife comprises a drive shaft rotatably supported by said spaced supporting members, a Geneva wheel gearing between said shaft and one of said cylinders, a counter shaft supported by said spaced supporting members above the second mentioned table, resilient means normally urging upward movement of the knife from the underlying table, and cam mechanism operatively coupling the counter shaft with the knife for exerting intermittent downward thrust upon the knife against the resistance of said spring.

3. A machine for pressing together and cutting string-like food stuff, of which spaghetti is an example, comprising a pair of spaced supports, a pair of parallel vertically spaced shafts rotatably supported by and between the supports, meshed gears carried by said shafts, a cylinder secured to and supported by each shaft, one of the cylinders having a number of circumferential grooves therein, the other cylinder having an equal number of groups of studs, the studs of each group being in relatively widely spaced circumferential relation around the supporting cylinder, the peripheries of the cylinders being in contact and the groups of studs being arranged whereby the studs will be pressed snugly into cooperating grooves upon rotation of the cylinders, a table on one side of the cylinders with its top at an elevation to facilitate the advancement of the food stuff thereover into the bight of the cylinders, a table on the other side of the cylinders for receiving the food stuff, a bridge member supported above the last mentioned table by and between said supports, plungers disposed vertically through guide openings in the bridge member for vertical movement, a knife connecting and carried by the lower ends of the plungers, a bar connecting the plungers at their upper ends, spring means interposed between the bar and the bridge member for normally urging movement of the plungers and knife upwardly, a cam roller carried upon said bar, a cam rotatably supported above said roller for contact therewith to effect downward movement of the knife against the resistance of said springs, and means for effecting the intermittent rotation of the cam and downward movement of the knife for effecting the cutting of food stuff passing across the table from the cylinders.

4. A machine of the character described in claim 3 wherein the table underlying the knife has a slot in alignment with the knife across which the food stuff moves, the knife having a beveled cutting edge and cooperating with an edge of the slot in the severing of the food stuff.

5. A machine of the character described in claim 3 wherein the means for effecting the intermittent rotation of the cam, comprises a rotatable shaft supporting the cam, a shaft disposed in parallel relation with one of the cylinders, a drive coupling between the last mentioned shaft and the cam shaft, and a Geneva wheel gearing coupling between the said last mentioned shaft and the shaft of the said adjacent one of the cylinders.

STAVROS FRANCIS PETERSON.

REFERENCES CITED

The following references are of record in the file of this patent:

UNITED STATES PATENTS

| Number | Name | Date |
|---|---|---|
| 313,061 | Copelin | Mar. 3, 1885 |
| 840,062 | Hueg | Jan. 1, 1907 |
| 1,576,339 | Laskey | Mar. 9, 1926 |
| 1,589,548 | O'Byrne | June 22, 1926 |